United States Patent
Sanchez et al.

(10) Patent No.: US 10,329,507 B2
(45) Date of Patent: Jun. 25, 2019

(54) COMPOSITION FOR REDUCING POLYNUCLEAR AROMATIC HYDROCARBON EMISSIONS

(71) Applicant: Inaeris Technologies, LLC, Pasadena, TX (US)

(72) Inventors: Vicente Sanchez, Houston, TX (US); Jeffrey C. Trewella, Kennett Square, PA (US); Roger L. Leisenring, Jr., Downingtown, PA (US)

(73) Assignee: Inaeris Technologies, Inc., Pasadena, TX (US)

( * ) Notice: Subject to any disclaimer, the term of this patent is extended or adjusted under 35 U.S.C. 154(b) by 0 days.

(21) Appl. No.: 14/727,358

(22) Filed: Jun. 1, 2015

(65) Prior Publication Data
US 2015/0259617 A1  Sep. 17, 2015

Related U.S. Application Data

(63) Continuation of application No. 13/750,747, filed on Jan. 25, 2013, now Pat. No. 9,051,525.

(51) Int. Cl.
*C10L 10/02* (2006.01)
*C10L 1/08* (2006.01)
*F02B 1/12* (2006.01)

(52) U.S. Cl.
CPC .............. *C10L 10/02* (2013.01); *C10L 1/08* (2013.01); *F02B 1/12* (2013.01); *C10G 2300/301* (2013.01); *C10G 2400/04* (2013.01); *C10L 2200/0446* (2013.01); *C10L 2200/0469* (2013.01); *C10L 2270/026* (2013.01); *C10L 2290/02* (2013.01); *C10L 2290/24* (2013.01); *Y02E 50/13* (2013.01); *Y02P 30/20* (2015.11)

(58) Field of Classification Search
CPC .... C10L 10/02; C10L 1/08; C10L 2200/0446; C10L 2200/0469; C10L 2270/026; C10L 2290/02; C10L 2290/24; C10G 2300/301; C10G 2400/04; F02B 1/12; Y02E 50/13
See application file for complete search history.

(56) References Cited

U.S. PATENT DOCUMENTS

| 7,883,882 B2* | 2/2011 | Franklin | C12N 9/00 208/58 |
| 8,748,678 B2* | 6/2014 | Knight | C10G 1/02 208/15 |
| 9,051,525 B2* | 6/2015 | Trewella | C10L 1/08 |
| 2007/0170091 A1* | 7/2007 | Monnier | C10G 3/46 208/15 |
| 2011/0126449 A1* | 6/2011 | Xu | C10L 1/1616 44/308 |

FOREIGN PATENT DOCUMENTS

| CA | 2812974 A1 | 3/2012 |
| CN | 101438445 A | 5/2009 |
| CN | 101896583 A | 11/2010 |
| WO | 2010053468 A1 | 5/2010 |

* cited by examiner

*Primary Examiner* — Cephia D Toomer
(74) *Attorney, Agent, or Firm* — John Wilson Jones; Jones Delflache LLP

(57) ABSTRACT

Emissions of polynuclear aromatic hydrocarbons (PAHs) from diesel engines may be reduced by blending a renewable hydrocarbon distillate with a base diesel fuel. The base diesel may be a fossil diesel fuel, a Fischer-Tropsch diesel fuel as well as a hydroprocessed biodiesel fuel or a combination thereof. The renewable hydrocarbon distillate is a fraction from hydrotreated bio-oil having a boiling point between from about 320° F. to about 700° F.

22 Claims, No Drawings

COMPOSITION FOR REDUCING POLYNUCLEAR AROMATIC HYDROCARBON EMISSIONS

This application is a continuation application of U.S. patent application Ser. No. 13/750,747, filed on Jan. 25, 2013.

FIELD OF THE INVENTION

The invention relates to diesel fuel compositions which exhibit significantly reduced exhaust emissions of polynuclear aromatic hydrocarbons (PAHs) and which contains a renewable hydrocarbon distillate.

BACKGROUND OF THE INVENTION

Exhaust emissions from diesel engines are known to pose significant health risks and to harmfully impact the environment. Such emissions include solid particulates of carbon and metals as well as hydrocarbons, sulfates and aqueous species which are adsorbed onto the solid particulates. Among the adsorbed species are polynuclear aromatic hydrocarbons (also called PAHs). PAHs are known to cause carcinogenic, mutagenic and teratogenic: activity in humans and other mammals.

Considerable effort has been undertaken to reduce the emissions of PAHs from diesel engines. At present, engine exhaust after-treatment devices, such as catalytic converters and particulate traps, have been used to mitigate the release of such toxins. Alternative methods have been sought which will reduce further the release of such toxins from diesel engines.

SUMMARY OF THE INVENTION

The invention is drawn to the use of a diesel fuel (such as a fossil diesel fuel, a Fischer-Tropsch diesel fuel and/or a hydroprocessed biodiesel derived from a ester prepared from a fatty acid and alcohol) in combination with a hydrocarbon distillate produced from a renewable energy source to reduce the amount of polynuclear aromatic hydrocarbons (PAHs) emissions from the diesel fuel.

In an embodiment, the invention is drawn to a diesel fuel composition containing the aforementioned diesel fuel and a renewable hydrocarbon distillate having a boiling point between from about 320° F. to about 700° F. The amount of PAHs emissions from a diesel engine using this diesel fuel composition is markedly reduced (compared to when a diesel fuel which does not contain the renewable hydrocarbon distillate is used). The presence of the renewable hydrocarbon distillate in the diesel fuel composition may reduce the amount of PAHs emissions from the diesel engine as much as five times. This unexpected result is significantly greater than expected and cannot be attributed to a simple dilution effect.

In an embodiment, the amount of renewable hydrocarbon distillate in the diesel fuel composition is between from about 0.1 to about 55 volume percent.

In another embodiment, the amount of renewable hydrocarbon distillate in the diesel fuel composition is between from about 5 to about 50 volume percent.

In another embodiment, the amount of renewable hydrocarbon distillate in the diesel fuel composition is between from about 10 to about 40 volume percent.

In still another embodiment, the amount of renewable hydrocarbon distillate in the diesel fuel composition is between from about 20 to about 35 volume percent.

In an embodiment, the renewable hydrocarbon distillate contains one or more hydrocarbons having from 5 to 9 double bond equivalents.

In another embodiment, the invention is drawn to a diesel fuel composition containing a renewable hydrocarbon distillate comprising one or more electrophilic hydrogen donors, such as tetralin, dihydroanthracene, dihydrophenanthrene or a dihydronaphthalene and alkyl derivatives thereof. In a preferred embodiment, the electrophilic hydrogen donor is an alkyl tetralin, such as a $C_1$-$C_5$ alkyl tetralin. There may be one or more alkyl groups on the tetralin ring structure. Further, either the alkyl group(s) or the aromatic ring(s) may be substituted. When blended with the aforementioned diesel fuel and introduced into a diesel engine, PAHs are markedly reduced (when compared to the amount of PAHs emitted when the diesel fuel composition does not contain the electrophilic hydrogen donor but only the petroleum diesel fuel).

In another embodiment, the invention is drawn to a diesel fuel composition containing a renewable hydrocarbon distillate having a boiling point between from about 320° F. to about 700° F. which, when blended with a petroleum diesel fuel, renders a No. 2 diesel fuel composition within the quality standards of ASTM D975.

In still another embodiment, the invention is drawn to a process for reducing exhaust emissions of one or more PAHs from a diesel engine by introducing into the engine a diesel fuel composition having from about 0.1 to about 55 percent by volume of a renewable hydrocarbon distillate from about 320° F. to about 700° F., wherein the renewable hydrocarbon distillate comprises one or more hydrocarbons having from 5 to 9 double bond equivalents, and further wherein the amount of the one or more hydrocarbons in the diesel fuel composition having from 5 to 9 double bond equivalents is between from about 10 to about 50 volume percent.

DETAILED DESCRIPTION OF THE PREFERRED EMBODIMENTS

The present invention relates to a diesel fuel composition comprising a petroleum diesel fuel, such as Diesel Number 1 or Diesel Number 2, Fischer-Tropsch diesel fuel and/or a hydroprocessed biodiesel derived from an ester or from a fatty acid. The diesel fuel composition contains the diesel fuel in combination with a renewable hydrocarbon distillate. The diesel fuel composition meets the quality standards for diesel fuels set by the American Society for Testing and Materials, ASTM D975.

For instance, the diesel fuel composition may be a No. 1 or No. 2 diesel fuel composition within the quality standards of ASTM D975. In a preferred embodiment, the diesel fuel composition is a No. 2 diesel fuel composition within the quality standards of ASTM D975.

Emissions of polynuclear aromatic hydrocarbons (PAHs) are dramatically reduced from diesel engines when using the diesel fuel composition defined herein. As such, the invention provides a means for reducing the load on engine exhaust after-treatment systems. This, in turn, provides for an extended service life to the after-treatment system. Since the present invention does not require changes in engine exhaust after-treatment systems, its impact on environmental PAH levels does not require turnover of diesel engine powered fleets.

The diesel fuel composition containing the renewable hydrocarbon distillate reduces the emissions of various PAHs. As used herein, PAHs shall include nitrogen-containing PAHs (NPAHs). In an embodiment, the renewable hydrocarbon distillate may reduce the emissions of such PAHs as benzo(a)anthracene, chrysene, benzo(b)fluoranthene, benzo(k)fluoranthene, benzo(a)pyrene, indeno[1,2,3-cd]pyrene, and dibenzo (a,h) anthracene. Generally these compounds can form bay-region epoxides in vivo which, in turn, enter the nucleus of the cell and intercollate into the DNA helix. This leads to alterations in gene expression and mutaganicity.

The renewable hydrocarbon distillate may be prepared by fractionating a hydrotreated bio-oil or pyrolysis oil and separating the hydrocarbon distillate having a boiling point between from about 320° F. to about 700° F. The addition of the 320° F. to 700° F. renewable hydrocarbon distillate to petroleum diesel fuel provides a diesel fuel composition capable of reducing emission of polynuclear aromatic hydrocarbons (PAHs) from the diesel engine.

The renewable distillate may originate from the treatment of biomass in a biomass conversion reactor. The renewable distillate may be produced by processes reported in the literature, including those reported in U.S. Pat. No. 8,022,260; U.S. Publication No. 20110154720; U.S. Publication No. 20110094147; U.S. Publication No. 20120101318; and U.S. patent application Ser. No. 13/553,742, all of which are herein incorporated by reference. Alternatively, the renewable distillate may originate from a deoxygenated pyrolysis feedstock produced by processes reported in the literature, including U.S. Pat. Nos. 8,329,969; 8,329,968; 8,329,967; and 8,324,438, all of which are herein incorporated by reference.

Existing biomass conversion processes include, for example, combustion, gasification, slow pyrolysis, fast pyrolysis, thermocatalytic, liquefaction and enzymatic conversion.

Biomass may be in the form of solid particles. The biomass particles can be fibrous biomass materials comprising cellulose. Examples of suitable cellulose-containing materials include algae, paper waste, and/or cotton linters. In one embodiment, the biomass particles can comprise a lignocellulosic material. Examples of suitable lignocellulosic materials include forestry waste such as wood chips, saw dust, pulping waste, and tree branches; agricultural waste such as corn stover, wheat straw, and bagasse; and/or energy crops such as eucalyptus, switch grass, and coppice. The biomass may be in a solid or finely divided form or may be a liquid. Typically, the water soluble content of the biomass is no greater than about 7 volume percent.

The biomass may be thermally treated (non-catalytically) to produce pyrolysis oil (which is relatively soluble in water) or thermocatalytically treated to render liquid products that spontaneously separate into an aqueous phase and an organic phase. Bio-oil (which is used to produce biofuel) consists of the organic phase.

In a preferred embodiment, the biomass is thermocatalytically converted into an oil-soluble, renewable crude oil in a biomass fluidized catalytic cracking (BFCC) unit. The renewable crude oil produced typically has an atomic oxygen content less than 25 volume percent.

Prior to being hydrotreated, undesirable heavy materials and solids may be separated from the bio-oil. Typically, from about 90 to 95 weight percent of the solids are removed from the mixture in the separator. For instance, the separator may be a coalescer, gravity phase separator, liquid hydrocyclone, electrostatic desalter, etc. Optionally and preferably, remaining solids in the mixture may further be removed, such as by polishing filtration. The removal of solids and heavy materials renders a bio-oil of high purity from renewable sources and facilitates hydrotreating.

In addition to the removal of heavy materials and solids, water may be removed during the separation.

The bio-oil, having the byproduct water, heavy materials and solids removed, is then introduced into a hydrotreater where the high purity bio-oil is subjected to deoxygenation by the introduction of hydrogen into the hydrotreater. Typically from 90 to about 99.99 volume percent of the oxygen is removed from the separated mixture in the hydrotreater. Typically, the oxygen complexes with the hydrogen to form water. Other by-products, such as hydrogen sulfide, are also formed in the hydrotreatment operation. The removal of organic sulfur from the intermediate hydrotreater feed is important since it is desirable for only a minimal amount, if any, of sulfur be present in the renewable hydrocarbon distillate.

Two or more hydrocarbon distillate fractions having a boiling point less than or equal to about 700° F. may be separated from the deoxygenated stream in one or more fractionators. These fractions may be a naphtha stream having a boiling point generally between from about 150° F. to about 350° F. and a hydrocarbon distillate having a boiling point between from about 320° F. to about 700° F. Diesel fuel is derived from the latter hydrocarbon distillate. Typically, the amount of oxygen in the hydrocarbon distillate is less than 0.5 wt %. Typically, the amount of sulfur in the hydrocarbon distillate is less than 25 parts per million weight (ppmw).

The renewable hydrocarbon distillate to be mixed with diesel fuel to render the diesel fuel composition is preferably prepared from an upgraded oil produced by hydrotreating an oil derived from the thermo-catalytic conversion of lignocelluloses.

Acceptable renewable hydrocarbon distillates include one or more hydrocarbons having from 5 to 9 double bond equivalents. Typically, between from about 10 to about 50, preferably between from 20 to about 35, volume percent of the renewable hydrocarbon distillate consists of one or more hydrocarbons having from 5 to 9 double bond equivalents.

In a preferred embodiment, the renewable hydrocarbon distillate contains at least one tetralin or alkyl tetralin (preferably at least one $C_1$-$C_5$ alkyl tetralin). In addition, to one or more tetralin or alkyl tetralins, the renewable hydrocarbon distillate may further contain a member selected from dihydroanthracenes, dihydrophenanthrenes, and dihydronaphthalenes and alkyl derivatives thereof. Normally, the distillate contains about 10-50 volume percent tetralin plus alkyl tetralins (collectively "tetralins"), more typically about 30 to about 35 percent. A representative renewable hydrocarbon distillate may contain, for example, about 50 volume percent cycloparaffins, 16 volume percent alkylbenzenes, and 30 volume percent indans and tetralins. Typically, the diesel fuel composition contains between from about 1 to about 1.5 volume percent tetralins when the amount of renewable hydrocarbon distillate in the diesel fuel composition is about 5 volume percent of the diesel fuel composition. When the diesel fuel composition contains about 25 volume percent of the renewable hydrocarbon distillate, the amount of tetralins in the diesel fuel composition is from about 5 to about 20 volume percent.

When present, the amount of dihydroanthracenes, dihydrophenanthrenes and/or dihydronaphthalenes or alkylated derivatives in the diesel fuel composition is less than 0.5 volume percent.

The diesel fuel composition may be prepared by adding to the aforementioned diesel fuel the renewable hydrocarbon distillate. The diesel fuel composition meets ASTM D975 diesel fuel specifications. Typically, the cetane number of the diesel fuel composition is from about 40 to about 50. The oxygen content in the diesel fuel composition is typically less than or equal to 0.05 percent by weight. The sulfur content in the diesel fuel composition is typically less than or equal to 0.0015 percent by weight.

Typically, the amount of PAHs emissions reduced by use of the diesel fuel composition described herein is at least twice the amount expected by dilution of the aforementioned petroleum based diesel fuel. In most instances, the amount of PAHs reduced by use of the diesel fuel composition described herein is five times or greater than when the petroleum diesel fuel is used without the renewable hydrocarbon distillate.

In an experimental run using a Ford 6.7 L diesel engine, it was determined that the amount of reduction of PAHs in the exhaust was an average of 12 volume percent without after-treatment (i.e., without the use of after-treatment devices, such as catalytic converters, particulate traps, etc.) when the diesel fuel composition contained just 5 volume percent of the renewable hydrocarbon distillate. This is greater than two times the amount expected by simple dilution of the petroleum diesel fuel. Further, it has been illustrated that the amount of PAHs reduced in the exhaust is an average of 30 volume percent with after-treatment devices when the diesel fuel composition contained 5 volume percent of the renewable hydrocarbon distillate. This is greater than 6 times the amount expected by simple dilution. The reduction of PAHs emissions from the engine is expected to further extend the service life of after-treatment devices which may be present.

While not wishing to be bound to any theory, it is believed that the reduction PAHs may be attributable to the presence of electrophilic hydrogen donors in the renewable hydrocarbon distillate, wherein one or more of the following reactions may occur:

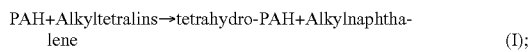

PAH+Alkyltetralins→tetrahydro-PAH+Alkylnaphthalene     (I);

and

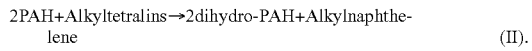

2PAH+Alkyltetralins→2dihydro-PAH+Alkylnaphthelene     (II).

The diesel fuel to which the renewable hydrocarbon distillate may be combined may be obtained from Fischer-Tropsch processing, hydrotreated esters or fatty acids, crude oil refining as well as hydroprocessing of crude petroleum source. The petroleum diesel fuel may be Diesel No. 1 or Diesel No. 2. [Petroleum diesel fuel is typically a distillate from crude oil obtained by collecting the fraction boiling at atmospheric pressure from about 480° F. to about 660° F. As used herein, "Diesel No. 1" and "Diesel No. 2" refer, respectively, to the fuels obtained from the lower boiling components and higher boiling components of this fraction.] These petroleum fuels can be used singly, or as desired, in any combination. It may further comprise a mixture of diesel fuel components. [Typically diesel fuel components comprise liquid hydrocarbon middle distillate fuel oils, for instance petroleum jet or turbine fuels, automotive fuels, railroad diesel fuels, heating oils and gas oil. They typically have a boiling point between from about the range of from about 300° F. to about 750° F., depending on grade and use.]

The amount of renewable hydrocarbon distillate in the diesel fuel composition is typically between from about 0.1 to about 55 volume percent, more often from about 3 to about 30 volume percent, more typically between from about 5 to about 25 volume percent.

The bio-oil, hydrotreated bio-oil, fractionated hydrotreated streams, diesel fuel and/or diesel fuel composition may be produced within the same refinery, plant or facility. Alternatively, the steps may be conducted in different plants. For instance, a petroleum diesel fuel may be produced in a petroleum refinery, a petroleum fuel storage facility or a petroleum fuel transportation system. A distillate blending system may be used to combine the petroleum diesel fuel with the renewable hydrocarbon distillate. Thus, as such, the process described herein may be a portion of a more comprehensive engineering design.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

Examples

The Examples illustrate vehicle exhaust emissions as a function of engine out (which includes exhaust after-treatment) and engine out (pre-aftertreatment). In the former, the exhaust emissions were subjected to the diesel oxidation catalyst and other emission control accessories (exhaust gas recirculation, particulate filter and selective catalytic reduction catalyst) on the vehicle and the latter was without the exhaust controls. The tests were performed with the engine on an engine stand.

To a renewable hydrocarbon distillate having a boiling point between from about 320° F. to about 700° F. and obtained by hydrotreating a bio-oil derived from lignocellulosic material was added a petroleum diesel fuel. Diesel Fuel A contained 5 volume percent of the renewable hydrocarbon distillate and Diesel Fuel B contained 25 volume percent of the renewable hydrocarbon distillate. The amount of polynuclear aromatic hydrocarbons (PAHs) emissions (ng/bhp-hr) was determined for each fuel example using a 2011 Ford 6.7 L engine, optionally using the corresponding after-treatment system of the Ford vehicle.

Emission analysis was conducted according to Coordinating Research Council (CRC), EPA and analytical procedures of Southwest Research Institute wherein emissions were analyzed by gas chromatography and high performance liquid chromatography. Particulates of PAHs were collected in a fluorocarbon-coated glass fiber filter and a PUF/XAD/PUF sandwich adsorbent trap was used to collect the volatile-phase. The PUF/XAD/PUF traps contained a layered sampling media consisting of a 1.25 inch deep layer of polyurethane foam (PUF), a 0.5 inch deep layer of XAD-2 resin and a second 1.25 inch layer of PUF. The PUF/XAD/PUF traps were sized to allow a media diameter of 4 inches which permitted an acceptable flow rate while maintaining a requisite face velocity. The detection threshold was 0.5 ng/hp-hr. Samples were then subjected to extraction and analysis. One half of each filter and the entire PUF/XAD/PUF sample material were extracted separately. Prior to extraction of the filters, each filter was spiked with an internal standard solution containing 100 ng each of deuterated PAHs. This internal standard was used to quantify the target PAHs in the sample. The filters were then Soxhlet extracted with methylene chloride for 10 hours and again with toluene for another 10 hours. For the PUF/XAD/PUF traps, each was spiked with the same amount of deuterated PAH as used for the filters. The trap samples were then Soxhlet extracted for at least 16 hours with methylene chloride. After extraction, the methylene chloride extract was reduced to 20 mL with a rotary evaporator with a water bath held at 95° F. The concentrated extract was then split into two portions: 16 ml (80%) and 4 ml (20%). The 80% portion was blown down to about 0.5 mL, diluted to 6 mL with hexane, acid- and base-washed, and then column fractionated with a one inch silica gel column. The final sample extract was blown down to 100 µL, and this concentrated sample was analyzed for PAH. Samples for both the volatile- and the particulate-phase PAH were analyzed by GC/MS with a 30 m by 0.25 mm i.d. DB-5 column and a 0.25 µm film thickness. Analysis for PAH compounds was performed using the positive ion/electron ionization (PI/EI) mode.

The results for emissions without after-treatment (engine out) are set forth in Table I and the results for emissions with after-treatment are set forth in Table II.

TABLE I

| PAH | Base Fuel Approx. (ng/bhp-hr) | Diesel Fuel A (ng/bhp-hr) | Diesel Fuel B (ng/bhp-hr) |
|---|---|---|---|
| Benzo(a)anthracene | 4548 | 4721 | 1126 |
| Chrysene | 3716 | 4093 | 1407 |
| Benzo(b)fluoranthene | 4115 | 3567 | 755 |
| Benzo(k)fluoranthene | 1152 | 1068 | 176 |
| Benzo(a)pyrene | 3943 | 3493 | 791 |
| Indeno[1,2,3-cd]pyrene | 1408 | 984 | 326 |
| Dibenzo(a,h)anthracene | 463 | 281 | 45 |

TABLE II

| PAH | Base Fuel Approx. (ng/bhp-hr) | Diesel Fuel A (ng/bhp-hr) | Diesel Fuel B (ng/bhp-hr) |
|---|---|---|---|
| Benzo(a)anthracene | 34.4 | 19.8 | 1.6 |
| Chrysene | 50.3 | 27.6 | 5.1 |
| Benzo(b)fluoranthene | 69.4 | 40.0 | 3.5 |
| Benzo(k)fluoranthene | 18.6 | 13.3 | 0.2 |
| Benzo(a)pyrene | 18.3 | 16.4 | 4.8 |
| Indeno[1,2,3-cd]pyrene | 15.3 | 19.7 | 2.5 |
| Dibenzo(a,h)anthracene | 6.4 | 1.8 | Not detected |

Table I shows that 5 of 7 PAHs were reduced by the addition of 5 volume percent hydrocarbon distillate and all of the PAHs were markedly reduced by the addition of 25 volume percent hydrocarbon distillate. The average PAH reduction using 5 volume percent renewable hydrocarbon distillate was approximately 12 percent and the average PAH reduction using 25 volume percent renewable hydrocarbon distillate was approximately 76 volume percent. The two PAH's that were not reduced using 5 volume percent hydrocarbon distillate were reduced almost 62 to 75 volume percent when the amount of renewable hydrocarbon distillate was increased to 25 volume percent. Table II shows that with aftertreatment all of the PAHs were markedly reduced as the amount of hydrocarbon distillate in the fuel blend was increased from 5 volume percent to 25 volume percent. The average PAH reduction using 5 volume percent renewable hydrocarbon distillate was approximately 30 percent.

From the foregoing, it will be observed that numerous variations and modifications may be effected without departing from the true spirit and scope of the novel concepts of the invention.

What is claimed is:

1. A diesel fuel composition comprising a renewable hydrocarbon distillate comprising electrophilic hydrogen donors and having less than 25 parts per million weight (ppmw) sulfur and produced by hydrotreating an oil derived from the conversion of a lignocellulosic biomass and removing sulfur from the hydrotreated oil, wherein the renewable hydrocarbon distillate has a boiling point between from about 320° F. to about 700° F., and further wherein the diesel fuel composition, when introduced into a diesel engine, reduces polynuclear aromatic hydrocarbon engine exhaust emissions.

2. The diesel fuel composition of claim 1, wherein the amount of renewable hydrocarbon distillate in the diesel fuel composition is between from about 0.1 to about 55 volume percent.

3. The diesel fuel composition of claim 1, wherein the oil subjected to hydrotreating is derived from liquefaction of the biomass.

4. The diesel fuel of claim 1, wherein the oil subjected to hydrotreating comprises pyrolysis oil derived from pyrolysis of the biomass.

5. The diesel fuel of claim 4, wherein, prior to being subjected to hydrotreatment, solids are separated from the pyrolysis oil.

6. The diesel fuel of claim 5, wherein, prior to being subjected to hydrotreatment, water is separated from the pyrolysis oil.

7. The diesel fuel composition of claim 2, wherein the amount of renewable hydrocarbon distillate in the diesel fuel composition is between from about 5 to about 25 volume percent.

8. The diesel fuel composition of claim 1, wherein the diesel fuel composition is a No. 2 diesel fuel composition within the quality standards of ASTM D975.

9. A process for reducing exhaust emissions of one or more polynuclear aromatic hydrocarbons from a diesel engine which comprises introducing into the engine the diesel fuel composition of claim 1.

10. A diesel fuel composition having less than or equal to 0.0015 percent by weight sulfur, the diesel fuel composition comprising a base diesel and a renewable hydrocarbon distillate, the renewable hydrocarbon distillate having a boiling point between from about 320° F. to about 700° F., the diesel fuel composition prepared by:
    (a) thermocatalytically converting lignocellulosic material in a biomass fluidized catalytic cracking unit;
    (b) removing 90 to 95 wt. % of solids from the thermocatalytically converted lignocellulosic material;
    (c) hydrotreating the product of (b) to render a deoxygenated stream;
    (d) removing sulfur from the deoxygenated stream;
    (e) separating a hydrocarbon distillate fraction having a boiling point between from about 320° F. to about 700° F. diesel fuel from the deoxygenated stream of (d) to render the renewable hydrocarbon distillate; and
    (f) blending the renewable hydrocarbon distillate with a petroleum diesel fuel, a Fischer-Tropsch diesel fuel, a hydroprocessed biodiesel derived from an ester or from a fatty acid, or a combination thereof.

11. The diesel fuel composition of claim 10, wherein from 90 to about 99.99 volume percent of oxygen is removed from the product of step (b) during hydrotreating in step (c).

12. A diesel fuel composition comprising a base diesel and a renewable hydrocarbon distillate, the diesel fuel composition prepared by:

(a) thermocatalytically converting lignocellulosic biomass to a bio-oil containing stream;
(b) separating solids from the bio-oil containing stream to render a separated bio-oil containing stream;
(c) subjecting the separated bio-oil containing stream to hydrotreatment to render hydrotreated bio-oil;
(d) removing sulfur from the hydrotreated bio-oil and recovering distillate having a boiling point between from about 320° F. to about 700° F. from the hydrotreated bio-oil, wherein the amount of sulfur in the recovered distillate is less than 25 parts per million weight (ppmw) and further wherein the recovered distillate contains electrophilic hydrogen donors; and
(e) mixing the recovered distillate from step (d) with the base diesel wherein the amount of sulfur in the diesel fuel composition is less than or equal to 0.0015 percent by weight.

13. The diesel fuel composition of claim 12, wherein from about 90 to 95 weight percent of solids are removed from the bio-oil containing stream in step (b).

14. The diesel fuel composition of claim 12, wherein the base diesel is selected from the group consisting of fossil diesel fuel, Fischer-Tropsch diesel fuel and hydroprocessed biodiesel fuel and combinations thereof.

15. The diesel fuel composition of claim 12, wherein the diesel fuel composition is a No. 2 diesel fuel composition within the quality standards of ASTM D975.

16. A process for reducing exhaust emissions of one or more polynuclear aromatic hydrocarbons from a diesel engine which comprises introducing into the engine the diesel fuel composition of claim 12.

17. The process of claim 16, wherein the amount of polynuclear aromatic hydrocarbon emissions reduced is at least two times the amount of amount of polynuclear aromatic hydrocarbon emissions reduced when the renewable hydrocarbon distillate is not present in the diesel fuel composition.

18. The process of claim 17, wherein the amount of polynuclear aromatic hydrocarbon emissions reduced is at least five times the amount of amount of polynuclear aromatic hydrocarbon emissions reduced when the renewable hydrocarbon distillate is not present in the diesel fuel composition.

19. The diesel fuel composition of claim 1, further comprising a hydroprocessed biodiesel derived from an ester or from a fatty acid.

20. The diesel fuel composition of claim 10, wherein the renewable hydrocarbon distillate in step (f) is blended with a petroleum diesel fuel.

21. The diesel fuel composition of claim 10, wherein the renewable hydrocarbon distillate in step (f) is blended with a Fischer-Tropsch diesel fuel.

22. The diesel fuel composition of claim 14, wherein the base diesel is fossil diesel fuel.

\* \* \* \* \*